(12) United States Patent
Ma et al.

(10) Patent No.: US 7,853,596 B2
(45) Date of Patent: Dec. 14, 2010

(54) MINING GEOGRAPHIC KNOWLEDGE USING A LOCATION AWARE TOPIC MODEL

(75) Inventors: Wei-Ying Ma, Beijing (CN); Chong Wang, Beijing (CN); Jinggang Wang, Guangzhou (CN); Xing Xie, Beijing (CN)

(73) Assignee: Microsoft Corporation, Redmond, WA (US)

( * ) Notice: Subject to any disclaimer, the term of this patent is extended or adjusted under 35 U.S.C. 154(b) by 334 days.

(21) Appl. No.: 11/766,716

(22) Filed: Jun. 21, 2007

(65) Prior Publication Data
US 2008/0319974 A1    Dec. 25, 2008

(51) Int. Cl.
*G06F 7/00* (2006.01)
*G06F 17/30* (2006.01)

(52) U.S. Cl. ................. 707/741; 707/749
(58) Field of Classification Search ........... 707/5
See application file for complete search history.

(56) References Cited

U.S. PATENT DOCUMENTS

| | | |
|---|---|---|
| 6,430,547 B1 | 8/2002 | Busche et al. |
| 6,768,994 B1 | 7/2004 | Howard et al. |
| 6,865,582 B2 | 3/2005 | Obradovic et al. |
| 7,010,526 B2 | 3/2006 | Denesuk et al. |
| 7,024,402 B2 | 4/2006 | Morimoto et al. |
| 7,130,837 B2 * | 10/2006 | Tsochantaridis et al. ...... 706/55 |
| 2002/0138607 A1 | 9/2002 | O'Rourke et al. |
| 2002/0188669 A1 | 12/2002 | Levine |
| 2005/0091209 A1 * | 4/2005 | Frank et al. .................... 707/3 |
| 2006/0020575 A1 | 1/2006 | Snapp et al. |
| 2006/0080554 A1 | 4/2006 | McDonald et al. |
| 2006/0206624 A1 | 9/2006 | Wang et al. |
| 2006/0271518 A1 | 11/2006 | Wang et al. |
| 2007/0118498 A1 * | 5/2007 | Song et al. .................... 707/1 |

OTHER PUBLICATIONS

"Geospatial Data Mining and Knowledge Discovery," A UCGIS White Paper, 2000 (21 pages).
Amitay, et al. "Web-a-Where: Geotagging Web Content", *SIGIR '04*, Jul. 25-29, 2004, Sheffield South Yorkshire, UK. © 2004 ACM 1-58113-881-4/04/0007.
Bishop. "Recent Advances in Bayesian Inference Techniques", *SIAM Conference on Data Mining*, Apr. 2004.
Blei, et al. "Latent Dirichlet Allocation", *Journal of Machine Learning Research 3*, Submitted Feb. 2002; Published Jan. 2003. pp. 993-1022.
Chawla, et al. "Modeling Spatial Dependencies for Mining Geospatial Data," 2001 (18 pages).

(Continued)

*Primary Examiner*—Mohammad Ali
*Assistant Examiner*—Kannan Shanmugasundaram
(74) *Attorney, Agent, or Firm*—Perkins Coie LLP (57) ABSTRACT

Mining geographic knowledge using a location aware topic model is provided. A location system estimates topics and locations associated with documents based on a location aware topic ("LAT") model. The location system generates the model from a collection of documents that are labeled with their associated locations. The location system generates collection level parameters based on an LDA-style model. To generate the collection level parameters, the location system estimates probabilities of latent topics, locations, and words of the collection. After the model is generated, the location system uses the collection level parameters to estimate probabilities of topics and locations being associated with target documents.

14 Claims, 8 Drawing Sheets

OTHER PUBLICATIONS

Gravano, et al. "Categorizing Web Queries According to Geographical Locality", CIKM '03, Nov. 3-8, 2003, New Orleans, Louisiana, USA. © 2003 ACM 1-58113-723-0/03/0011.

Jensen, et al. "Location-Based Services—A Database Perspective", 2002 (10 pages).

Mei, et al. "A Probabilistic Approach to Spatiotemporal Theme Pattern Mining on Weblogs", *WWW 2006*, May 23-26, 2006, Edinburgh, Scotland. ACM 1-59593-323-9/06/0005.

Wang, et al. "Detecting Dominant Locations from Search Queries", *SIGIR '05*, Aug. 15-19, 2005, Salvador, Brazil.

Wang, et al. "Detecting Geographic Locations from Web Resources", *GIR '05*, Nov. 4, 2005, Bremen, Germany. © 2005 ACM 1-59593-165-1/05/0011.

Wang, et al. "Mining Geographic Knowledge Using Location Aware Topic Model", Workshop on Geographic Information Retrieval, Proceedings of the 4th ACM Workshop on Geographical Information Retrieval, Lisbon, Portugal. Published 2007, pp. 65-70.

Wang, et al. "Topics over Time: A Non-Markov Continuous-Time Model of Topical Trends", ACM SIGKDD-2006, Aug. 20-23, 2005, Philadelphia, Pennsylvannia, USA.

* cited by examiner

MINING GEOGRAPHIC KNOWLEDGE USING A LOCATION AWARE TOPIC MODEL

BACKGROUND

Many online activities are associated with a particular geographic location. For example, people may generate a personal web log ("blog") that provides accounts of their recent trips, read news articles relating to events in their local communities, and search the web to find local restaurants. The identification of the geographic location associated with a document (e.g., web page, blog, or query) is useful in many applications. For example, many location-based web applications have been developed to support mobile devices and local searching needs. Such location-based web applications include navigation systems, location-based search systems, local advertisement systems, geographic retrieval systems, and so on. These web applications typically need to detect a geographic location of a web resource and match it with the user's current location. For example, a cellular phone user may want to find a restaurant that is near the user's current location. A web application could match the user's current location as indicated by the cellular phone with the location of restaurants to identify which restaurants may be nearby.

Although some web pages have been manually annotated with metadata that describes the associated geographic locations, most web pages have not. Various techniques have been developed to mine the geographic location of documents. Such techniques are generally based on gazetteers and disambiguation algorithms. For example, one technique may extract locations by looking up every word of the document in a gazetteer to identify the words that correspond to that location. Such techniques, however, have problems. For example, many geographic terms may have nongeographic meanings. The word "Java" may represent an island in Indonesia, a programming language, a coffee brand, a French band, and so on. As another example, many locations share the same name. In the United States, there are at least 17 cities named "Columbus." As another example, documents may also contain geographic locations that are not of interest, such as copyright information about the location of a publisher. Some geographic location information may be implicit in words of the document that do not directly correspond to a geographic location and thus would not show up in a gazetteer. For example, the word "Sunni" may have strong implicit correlation to the location of Iraq.

Many applications may use the topics of a document in their processing. For example, the topics can be used by search applications and document summarization application. Many different techniques have been developed to identify the topics of documents. The Latent Dirichlet Allocation (LDA) is a technique that identifies a fixed number of latent topics in a collection of documents based on similarity of words of the documents. Each word in the collection of documents has a probability of being related to each of the latent topics. For example, if the fixed number of latent topics is five, the word "magic" may have probabilities of 0.02, 0.04, 0.01, 0.01, and 0.02 for each of the latent topics. Based on the probabilities of the words of a document, each document has a probability of being related to each of the latent topics. A document may have the probabilities of 0.2, 0.1, 0.1, 0.1, and 0.5 for each of the latent topics. Given a collection, LDA learns the probability that each word of the collection relates to each latent topic and the probability that a document in the collection relates to each topic. LDA uses the learned probabilities to calculate the probability that a document not in the collection relates to each of the latent topics.

Figure 1:
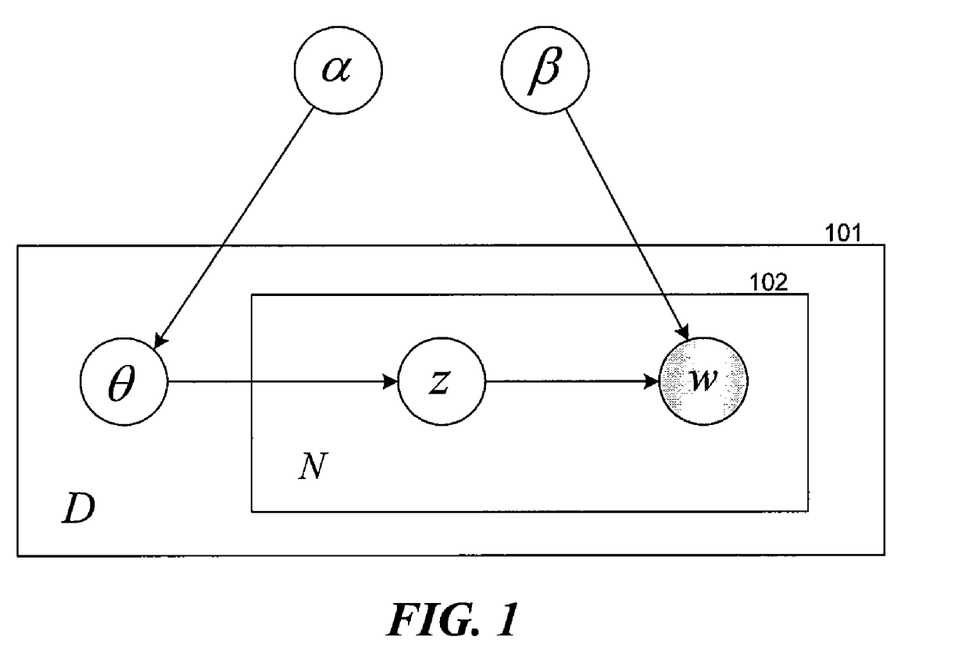
FIG. 1 is a graphical representation of the LDA model.

More specifically, LDA provides a generative probabilistic model of a collection of documents based on a Dirichlet distribution. The documents of the collection are represented as random mixtures over latent topics, and each topic is characterized by a distribution of words. Using inference techniques, LDA learns from a collection of documents parameters for the model representing the relationship between words of the documents and the latent topics. The parameters of the model include k representing the number of latent topics, $\beta_{ij}$ representing the probability that word $w^j$ is related to topic $z^i$, $\theta$ representing a Dirichlet random variable that is a k-element vector of the probability that a document relates to each of the k topics, and $\alpha$ representing a k-element vector indicating the probability that a document within the collection relates to each of the k topics. FIG. 1 is a graphical representation of the LDA model. The rectangle 101 represents the collection of D documents, and the rectangle 102 represents the N words in a document. As shown, there is one $\beta$ and one $\alpha$ for the entire collection, one $\theta$ for each document, and one topic z for each word. LDA represents the probability distribution for the parameter $\theta$ as follows:

$$p(\theta \mid \alpha) = \frac{\Gamma\left(\sum_{i=1}^{k} \alpha_i\right)}{\prod_{i=1}^{k} \Gamma(\alpha_i)} \theta_1^{\alpha_1 - 1} \ldots \theta_k^{\alpha_k - 1}$$

where $\Gamma(x)$ represents the Gamma function. LDA represents the joint distribution of a topic mixture as follows:

$$p(\theta, z, w \mid \alpha, \beta) = p(\theta \mid \alpha) \prod_{n=1}^{N} p(z_n \mid \theta) p(w_n \mid z_n, \beta)$$

where $p(z_n \mid \theta)$ represents $\theta_i$ for the unique i such that $z_n^i = 1$. This joint distribution represents the probability of any combination of $\theta$, z, and w given $\alpha$ and $\beta$ where w represents a vector of words of the document and z represents a vector with a topic for each word of the document. LDA represents a marginal distribution of a document as follows:

$$p(w \mid \alpha, \beta) = \int p(\theta \mid \alpha) \left( \prod_{n=1}^{N} \sum_{z_n} p(z_n \mid \theta) p(w_n \mid z_n, \beta) \right) d\theta$$

The marginal distribution represents the probability of the document w given $\alpha$ and $\beta$. LDA represents the probability of the collection as the product of the marginal probabilities of the documents as follows:

$$p(D \mid \alpha, \beta) = \prod_{d=1}^{M} \int p(\theta_d \mid \alpha) \left( \prod_{n=1}^{N_d} \sum_{z_{dn}} p(z_{dn} \mid \theta_d) p(w_{dn} \mid z_{dn}, \beta) \right) d\theta_d$$

where D represents the collection, M represents the number of documents in the collection, $\theta_d$ represents $\theta$ for document d, $z_{dn}$ represents z for word n of document d, and $w_{dn}$ represents w for word n of document d.

LDA estimates the parameters using a variational expectation maximization ("EM") procedure. The procedure maximizes a lower bound with respect to variational parameters and then for fixed values of the variational parameters maximizes the lower bound with respect to the model parameters α and β. Once the parameters are learned, LDA can calculate the joint distribution for θ and z given w, α, and β as represented as follows:

$$p(\theta, z \mid w, \alpha, \beta) = \frac{p(\theta, z, w \mid \alpha, \beta)}{p(w \mid \alpha, \beta)}$$

Since the solution is computationally complex, LDA may use an approximation based on variational inference as described in Blei, D., Ng, A., and Jordan, M., "Latent Dirichlet Allocation," Journal of Machine Learning Research, 3:993-1022, January 2003. Thus, given a document, LDA can apply this equation to determine the probability distribution of the topics for the document and for each word within the document.

SUMMARY

Mining geographic knowledge using a location aware topic model is provided. A location system estimates topics and locations associated with documents based on a location aware topic ("LAT") model. The location system generates the model from a collection of documents that are labeled with their associated locations. The location system generates collection level parameters based on an LDA-style model. The location system extends an LDA-style model to learn word-location relationships based on the assumption that topics are dependent on geographic locations. The location system uses an LDA-style model to model the relationships between locations and words. To generate the collection level parameters, the location system estimates probabilities of latent topics, locations, and words of the collection. After the model is generated, the location system uses the collection level parameters to estimate probabilities of topics and locations being associated with target documents.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Mining of geographic knowledge using a location aware topic model is provided. In some embodiments, a location system estimates topics and locations associated with documents based on a location aware topic ("LAT") model. The location system generates the model from a collection of documents that are labeled with their associated locations. The documents and their labels represent training data for learning the LAT model. The documents may be text of queries that have been submitted to a search engine, web pages, news articles, blogs, discussion thread, and so on. The location system generates collection level parameters based on an LDA-style model. The location system extends an LDA-style model to learn word-location relationships based on the assumption that topics are dependent on geographic locations. The location system uses an LDA-style model to model the relationships between locations and words. The location system considers each word of the document to be associated with the geographic location based on a latent topic. To generate the collection level parameters, the location system estimates probabilities of latent topics, locations, and words of the collection. For example, the location system may estimate a probability that a document in the collection relates to each latent topic, a probability that each word of the collection relates to each latent topic, and a probability that each location of the collection each latent topic. After the model is generated, the location system uses the collection level parameters to estimate probabilities of topics and locations being associated with target documents. For example, the location system may estimate a probability that a location is associated with the document based on an aggregation of, for each topic, the conditional probability of the location given the topic and the conditional probability of the topic given the document.

Figure 2A:
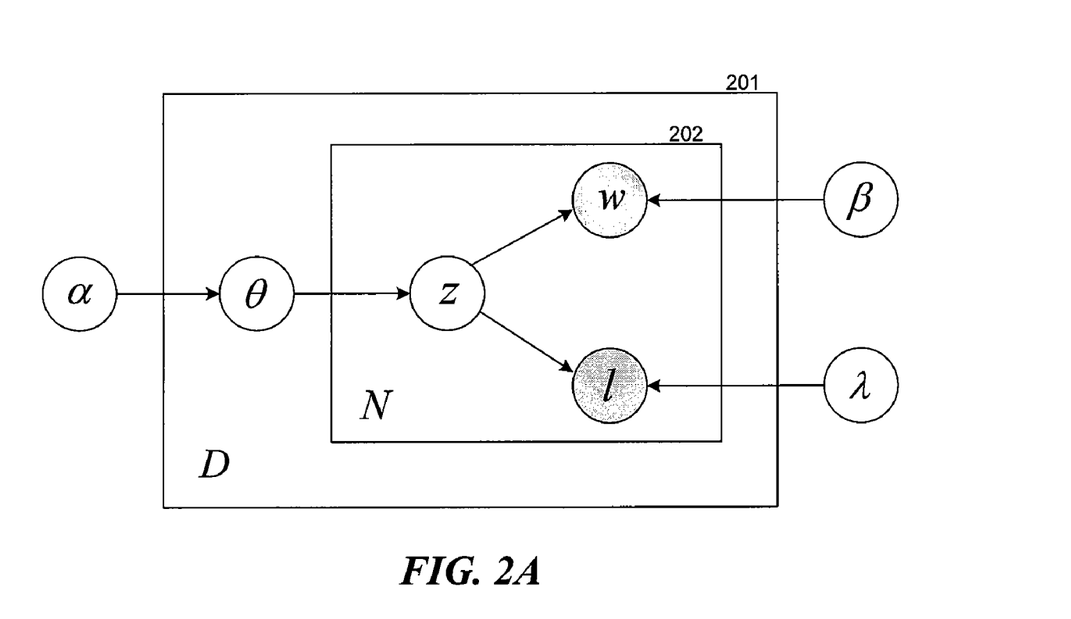
FIGS. 2A and 2B are graphical representations of the LAT model.

In some embodiments, the location system uses a LAT model to model the locations associated with documents of a collection. The location system identifies the relationship between words and locations. The location system assumes that each word of each document is associated with a location. In addition to the parameters of the LDA model, the LAT model includes the parameter $\lambda_{ij}$ representing the probability that location $l^i$ is related to topic $z^i$. FIG. 2A is a graphical representation of the LAT model. The rectangle 201 represents the collection of D documents, and the rectangle 202 represents the N words in a document. As shown, there is one β, one λ, and one α for the entire collection, one θ for each document, and one topic z for each word and location. The generative process of the LAT model can be represented as follows:

1) Choose θ~Dirichlet(α).
2) For each word $w_n$ in document d:
   a) Choose a topic $z_n$~Multinomial (θ).
   b) Choose a word $w_n$~$p(w_n|z_n,\beta)$, which is a topic-specific multinomial probability distribution.
   c) Choose a location $l_n$~$p(l_n|z_n,\lambda)$, which is a topic-specific multinomial probability distribution.

Figure 2B:
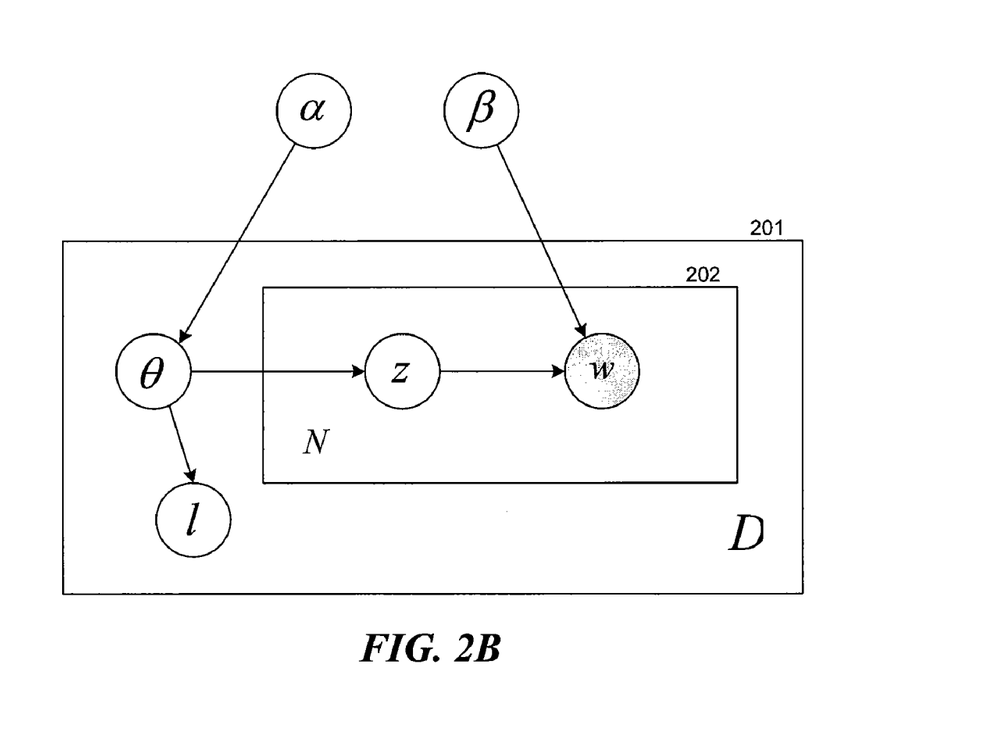

The location system may label each word in each document with a location and then learn the parameters. However, since it can be very time-consuming to label each word of each document in a collection with a location, the location system may assume that each document is associated with one location. FIG. 2B is a graphical representation of the LAT model with a single location per document. Thus, each word of a document is assumed to relate to the location of the document. As illustrated by FIG. 2B, the location for a document is generated from the parameter θ for the document. Since a document may in fact be related to multiple locations, the location system may make a copy of each document for each location and labels each copy with a single location. Since it may still be time consuming to label each document with its locations, the location system may use a location extraction technique to automatically identify the locations within each document.

In some embodiments, the location system may use a hierarchy of locations such as country, state, and city. Once a document is labeled with a location, the location system may also assign the ancestor locations within the hierarchy to that document. For example, a document labeled with the location New Orleans may also be labeled with the location Louisiana and USA. It can be computationally expensive to learn the parameters based on a hierarchy of locations. To avoid this expense, the location system may use only one level of the hierarchy for labels. For example, if the documents are to be labeled at the country level, the location system may map the city and state labels of a document to its parent country. In such a case, the location system will map initial labels of New Orleans and Louisiana to USA.

Because of the computational complexity involved in solving hierarchical Bayesian models, the location system uses a variational approximation. The location system may use other approximation techniques such as a Markov Chain Monte Carlo technique or a Laplace approximation technique. The location system infers the posterior probability of θ and z given w, l, β, λ, and α as represented as follows:

$$p(\theta, z | w, l, \alpha, \beta, \lambda) \quad (1)$$

The LAT model represents the joint distribution of the parameters θ, z, w, and l given α, β, and λ as follows:

$$p(\theta, z, w, l | \Theta) = p(\theta | \alpha) p(z | \theta) p(w, l | z, \beta, \lambda) \quad (2)$$
$$= p(\theta | \alpha) \prod_{n=1}^{N} p(z_n | \theta) p(w_n | z_n, \beta) p(l_n | z_n, \lambda)$$

where $\Theta = \{\alpha, \beta, \lambda\}$.

According to the Bayesian rule, the joint distribution can be represented as follows:

$$p(\theta, z, w, l | \Theta) = p(\theta, z | w, l, \Theta) p(w, l | \Theta) \quad (3)$$

The computing of $p(w, l | \Theta)$ requires marginalizing out θ and z as follows:

$$p(w, l | \Theta) = \int p(\theta, z, w, l | \Theta) d\theta dz \quad (4)$$
$$= \int p(w, l | \theta, z, \Theta) p(\theta | \alpha) p(z | \theta) d\theta dz$$

Since such marginalizing is computationally complex, the location system approximates the posterior probability of Equation 1 as follows:

$$q(\theta, z | \gamma, \phi) = q(\theta | \gamma) \prod_{n=1}^{N} q(z_n | \phi_n) \quad (5)$$

where γ represents the Dirichlet parameter and $\phi = \{\phi_1, \phi_2, \ldots, \phi_N\}$ represents the multinomial parameters. The variational approximation provides a lower bound of the log likelihood of $p(w, l | \Theta)$ using an optimization problem as follows:

$$(\gamma^*, \phi^*) = \text{argmin}_{(\gamma, \phi)} KL(q(\theta, z | \gamma, \phi) \| p(\theta, z | w, l, \Theta)) \quad (6)$$

where KL represents the Kullback-Leibler distance between the distributions. The location system can calculate the KL distance using an iterative procedure. The location system can represent this optimization problem as follows:

$$\phi_{ni} \propto \lambda_{il_n} \beta_{iw_n} \exp\{E_q[\log(\theta_i) | \gamma]\} \quad (7)$$
$$\gamma_i = \alpha_i + \sum_{n=1}^{N} \phi_{ni}$$

where $E_q[\log(\theta_i) | \gamma] = \psi(\gamma_i) - \psi(\Sigma \gamma_i)$ and ψ represents the derivative of the Gamma function. The location system may approximate this derivative using a Taylor expansion. The location system solves the optimization problem using an iterative procedure. After each step, the location system normalizes each $\phi_n$ so that it sums to 1.

Given an unlabeled document, the location system uses Equation 5 to approximate the posterior probability. The location system approximates the conditional probability for the document over the locations as follows:

$$p(l | w, \Theta) \approx \sum_{n=1}^{N} \sum_{z_n} p(l | z_n, \lambda) q(z_n | \phi_n) \quad (8)$$

To determine locations of a certain word of a document, the location system can represent the conditional probability as follows:

$$p(l | w_n, w, \Theta) \approx \Sigma_{z_n} p(l | z_n, \lambda) q(z_n | \phi_n) \quad (9)$$

The location system may also estimate the conditional probability when given a word as follows:

$$p(l | w, D, \Theta) \propto \sum_{d=1}^{D} p(l | w, w_d, \Theta) p(w_d | w) \quad (10)$$

where $p(w \in w_d)$ represents the probability of document $w_d$ containing w and $p(w_d | \Theta)$ an also be approximated in the similar approach that approximates $p(w, l | \Theta)$.

To learn the collection level parameters $\Theta = \{\alpha, \beta, \lambda\}$, the location system maximizes the log likelihood function with respect to Θ over the data set $T = \{d_1, d_2, \ldots d_D\}$ as represented by the following:

$$\Theta^* = \text{argmax}_\Theta \ell(\Theta) = \sum_{d=1}^{D} \log p(w_d, l_d | \Theta) \quad (11)$$

The location system approximates this equation using a lower bound of $p(w_d,l_d|\Theta)$ to maximize the lower bound of the log likelihood of $\Theta$. The location system uses the variational EM algorithm as represented by the following:

Variational E-step: for each document $w_d$, compute the document-dependent $(\gamma^*,\phi^*)$, and the lower bound of log $p(w_d,l_d|\Theta)$, and obtain the lower bound $l(\Theta)$.

M-step: maximize the resulting lower bound with respect to the collection level parameter $\Theta=\{\alpha,\beta,\lambda\}$.

The location system repeats the steps until they converge on a solution. The updating function of $\beta$ and $\lambda$ are represented by the following:

$$\beta_{ij} \propto \sum_{d=1}^{D} \sum_{n=1}^{N_d} \phi^*_{dni} w^j_{dn} \qquad (12)$$

$$\lambda_{ij} \propto \sum_{d=1}^{D} \sum_{n=1}^{N_d} \phi^*_{dni} l^j_{dn}$$

The location system also normalizes $\beta$ and $\lambda$ so that $\Sigma_j \beta_{ij}$ and $\Sigma_j \lambda_{ij}$ are equal to one. The location system can optimize $\alpha$ using the Newton method or set it to a constant.

In some embodiments, a location topic browser system uses the location system to map queries to their related topics and/or locations. The queries of the location topic browser system may include a "what" field and a "where" field. The "what" field represents the search terms of the query, and the "where" field represents a location. The location topic browser system uses the location system to identify locations and topics associated with the query. The location topic browser system may display identified locations ranked based on their probability of being associated with the query and display the identified topics ranked based on their probability of being associated with a query. Since the latent topics may not have manually generated labels, the location topic browser system may select top words with the highest probability of being associated with each topic and display those words as a description of the topic. The location topic browser system may also display an indication of documents that are most similar to the query based, for example, on a cosine similarity score between a vector representing the text of the "what" and "where" fields and a vector representing the document.

The location topic browser system may handle differently queries that include only the "what" field, only the "where" field, and both the "what" and the "where" fields. When the query includes only the "what" field, the location topic browser system may calculate the probability of locations according to the following:

$$p(l|w)=\Sigma_z p(l|z)p(z|w) \qquad (13)$$

where $p(l|w)$ represents the probability of a location given the "what" field. The probability is the summation, for each topic, of the probability of the location given the topic times the probability of the topic given the "what" field. This probability can be approximated using Equation 8. The probability of a topic being associated with a location may be represented by $p(z|w)$, which can be approximated by the terms of Equation 5 as follows:

$$\prod_{n=1}^{N} q(z_n|\phi_n) \qquad (14)$$

When the query includes only the "where" field, the location topic browser system calculates the probability of locations according to the following:

$$p(l|l_0)=\Sigma_z p(l|z)p(z|l_0) \qquad (15)$$

where $p(l|l_0)$ represents the probability of a topic given the "where" field. The probability is the summation, for each topic, of the probability of a location given the topic times the probability of the topic given the "where" field. The probability of a topic being associated by the "where" field may be represented by $p(z|l_0)$, which is the probability of the topic given the "where" field as follows:

$$p(z|l_0) = \frac{p(l_0|z)p(z)}{p(l_0)} \propto p(l_0|z) \qquad (16)$$

where $p(z)$ is a constant.

When the query includes both the "what" field and the "where" field, the location topic browser system represents the probability of a location by the following:

$$p(l|l_0,w)=\Sigma_z p(l|z)p(z|l_0,w) \qquad (17)$$

where $p(l|l_0,w)$ represents the probability of a location given the "what" field and the "where" field. The probability of a topic being associated with the "what" field and the "where" field may be represented as $p(z|l_0,w)$, which is the probability of the topic given the "what" field and the "where" field.

The location topic browser system may display a map of the world. When a user selects a location, the location topic browser system may highlight that location on the map. When a user selects a location on the map, the location topic browser system may present documents related to that location. The location topic browser system allows the user to submit a new query by simply selecting a displayed location or a word associated with a topic.

Figure 3:
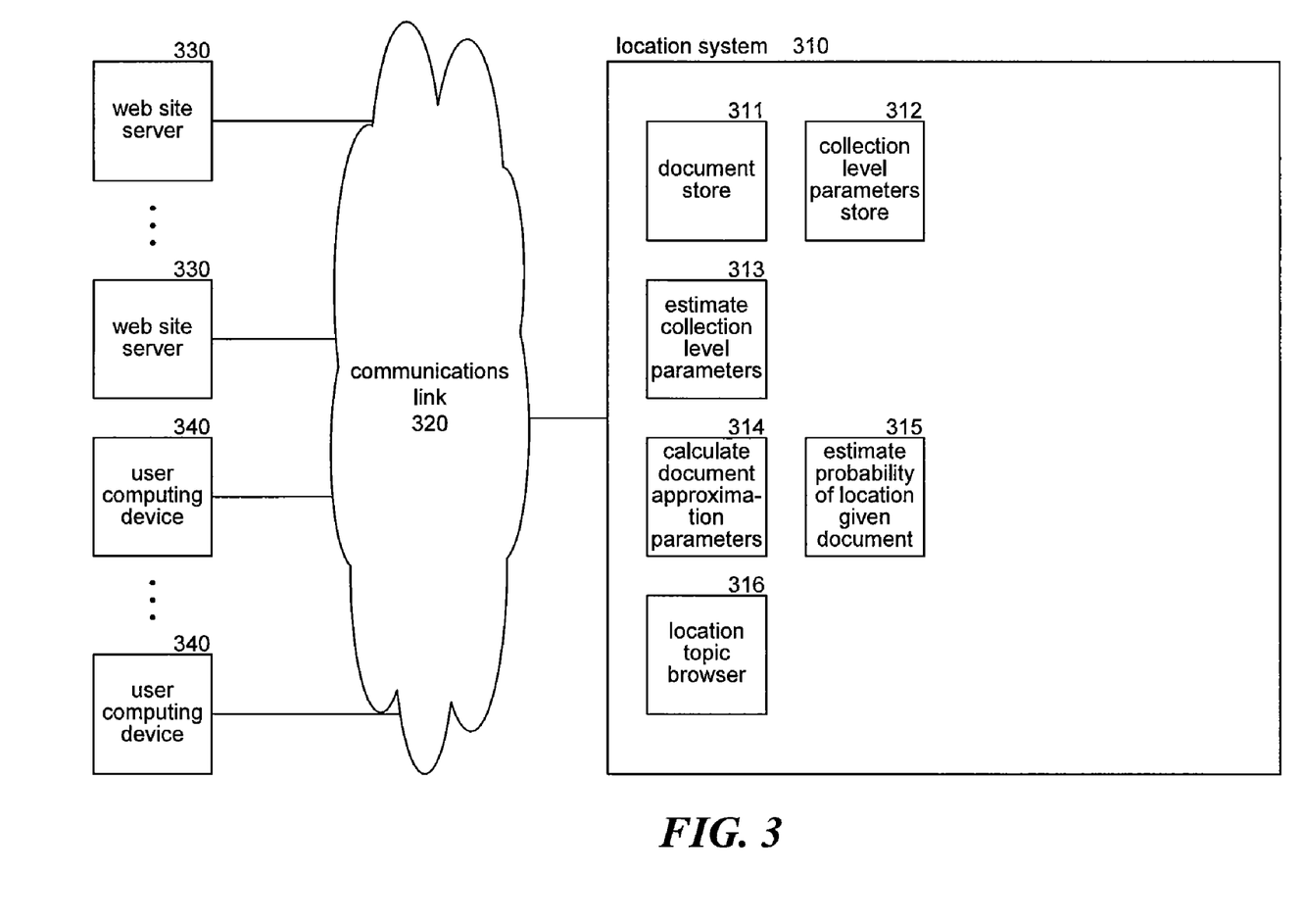
FIG. 3 is a block diagram that illustrates components of the location system in one embodiment.

FIG. 3 is a block diagram that illustrates components of the location system in one embodiment. A location system 310 may be connected to web site servers 330 and user computing devices 340 via a communications link 320. The location system may collect documents from the various web site servers and allow users at the user computing devices to search the collection for topics and locations of interest. The location system 310 may include a document store 311, a collection level parameters store 312, an estimate collection level parameters component 313, a calculate document approximation parameters component 314, an estimate probability of location given document component 315, and a location topic browser component 316. The document store contains the documents from which the location system generates its model. The collection level parameters store contains the collection level parameters generated when learning the model. The estimate collection level parameters component performs the learning of the collection level parameters. The calculate document approximation parameters component calculates document approximation parameters for a single document. The estimate probability of location given document component estimates the probability of a location being associated with a document. The location topic browser component provides the location topic browser system as described above.

The computing device on which the location system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the instructions, data structures, and message structures may be stored or transmitted via a data transmission medium, such as a signal on a communications link. Various communications links may be used, such as the Internet, a local area network, a wide area network, a point-to-point dial-up connection, a cell phone network, and so on.

Embodiments of the location system may be implemented in or used in conjunction with various operating environments that include personal computers, server computers, hand-held or laptop devices, multiprocessor systems, microprocessor-based systems, programmable consumer electronics, digital cameras, network PCs, minicomputers, mainframe computers, cell phones, personal digital assistants, smart phones, personal computers, programmable consumer electronics, distributed computing environments that include any of the above systems or devices, and so on.

The location system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, a separate computing system may be used to learn the collection level parameters and to identify the locations of target documents using the collection level parameters.

Figure 4:
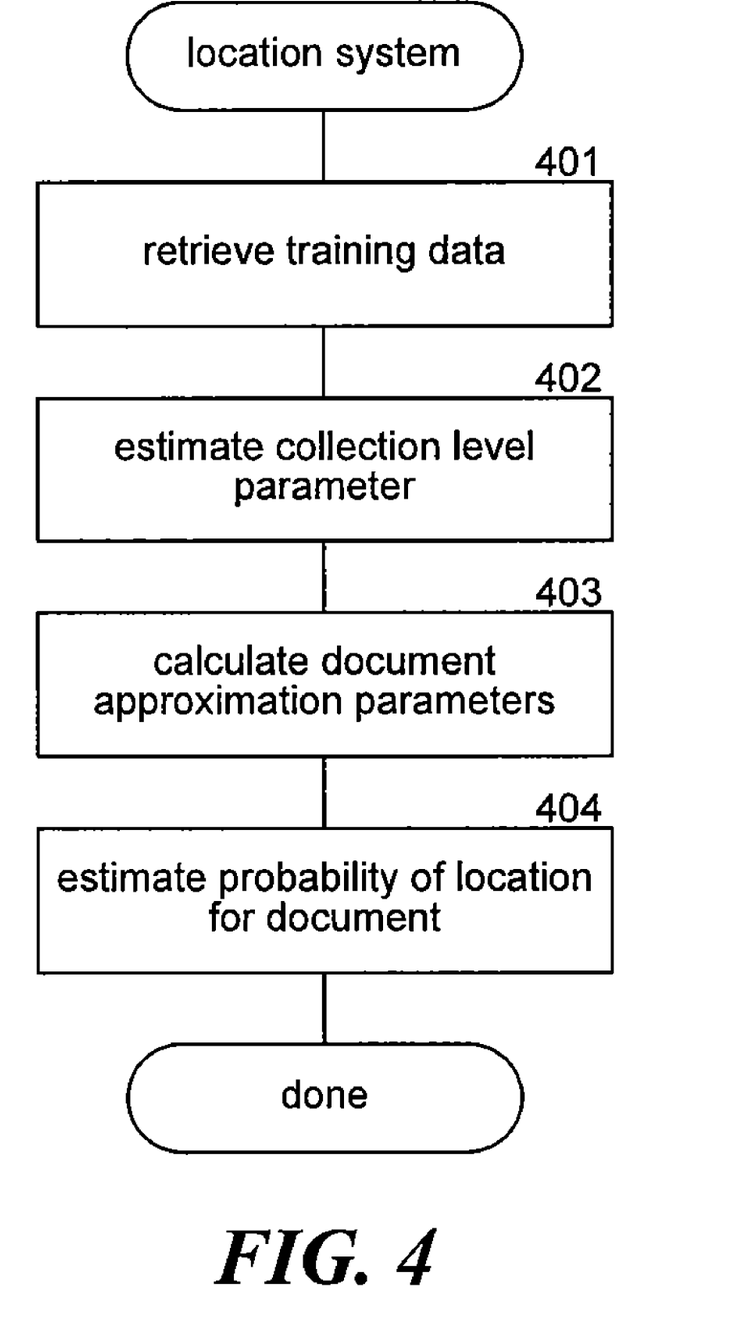
FIG. 4 is a flow diagram that illustrates the overall processing of the location system in some embodiments.

FIG. 4 is a flow diagram that illustrates the overall processing of the location system in some embodiments. Blocks 401-402 represent a training phase to learn the model and need only be performed once for a collection of documents. Blocks 403-404 represent using a model to determine the location associated with a target document and is performed once for each target document. In block 401, the component retrieves the training data that includes documents and their locations. In block 402, the component estimates the collection level parameters for an LDA-style model. In block 403, the component calculates document approximation parameters for the target document. In block 404, the component estimates the probability of a location being associated with the target document using the collection level parameters and the document approximation parameters and completes.

Figure 5:
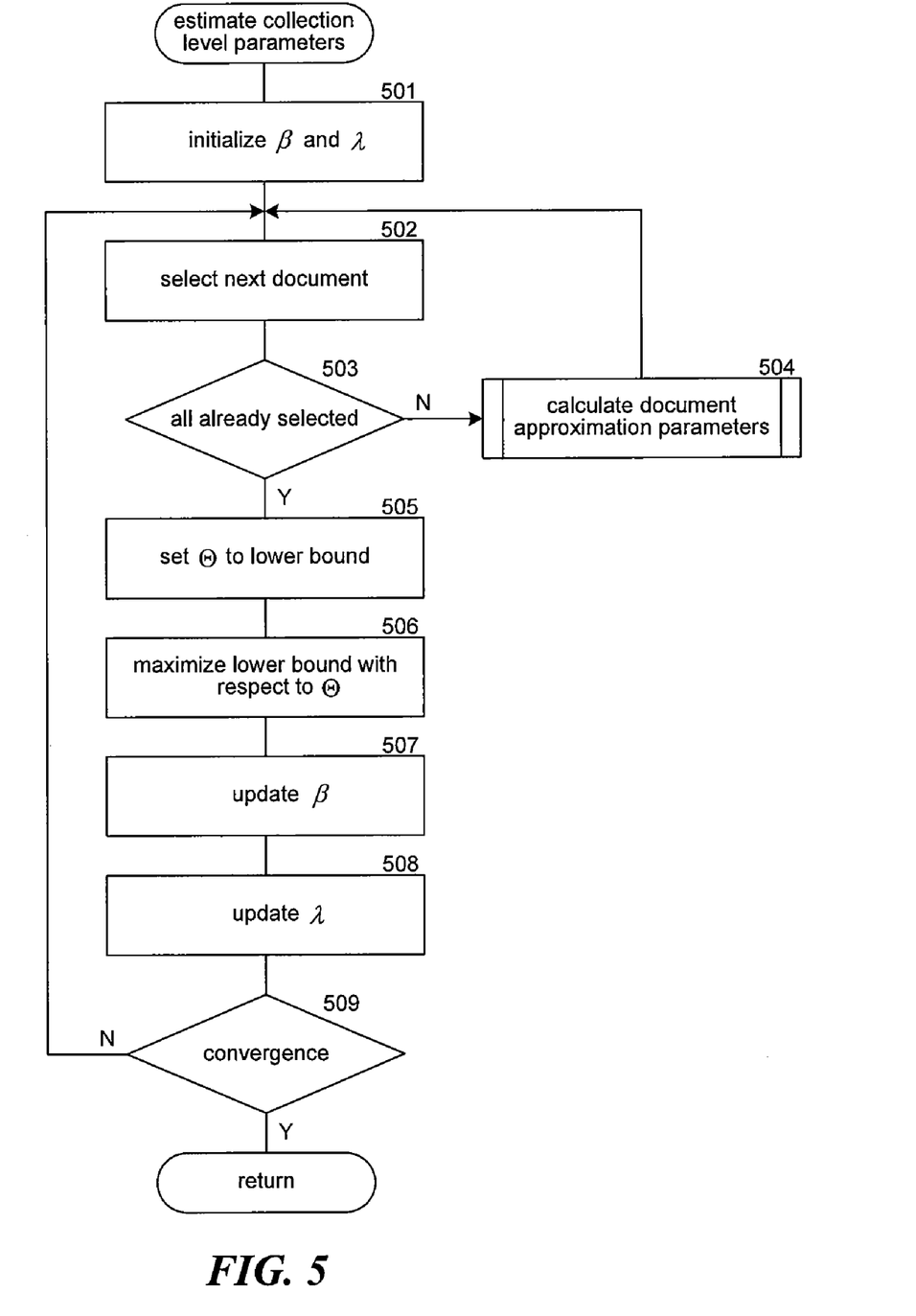
FIG. 5 is a flow diagram that illustrates the processing of the estimate collection level parameters component of the location system in one embodiment.

FIG. 5 is a flow diagram that illustrates the processing of the estimate collection level parameters component of the location system in one embodiment. In block 501, the component initializes the topic probability distribution for each word and the location probability distribution for each word. In blocks 502-509, the component performs iterations updating the collection level parameters until they converge on a solution. In blocks 502-504, the component calculates approximation parameters for each document in the collection using the current topic and location probability distributions. In block 502, the component selects the next document. In decision block 503, if all the documents have already been selected, then the component continues at block 505, else the component continues at block 504. In block 504, the component invokes a calculate document approximation parameters component to calculate the document approximation parameters for the selected document and then loops to block 502 to select the next document. In block 505, the component sets the collection parameters to the lower bound. In block 506, the component maximizes the lower bound with respect to the collection parameters. In block 507, the component updates the topic probability distributions. In block 508, the component updates the location probability distributions. In decision block 509, if the lower bound converges on a solution, then the component returns, else the component loops to block 502 to perform the next iteration.

Figure 6:
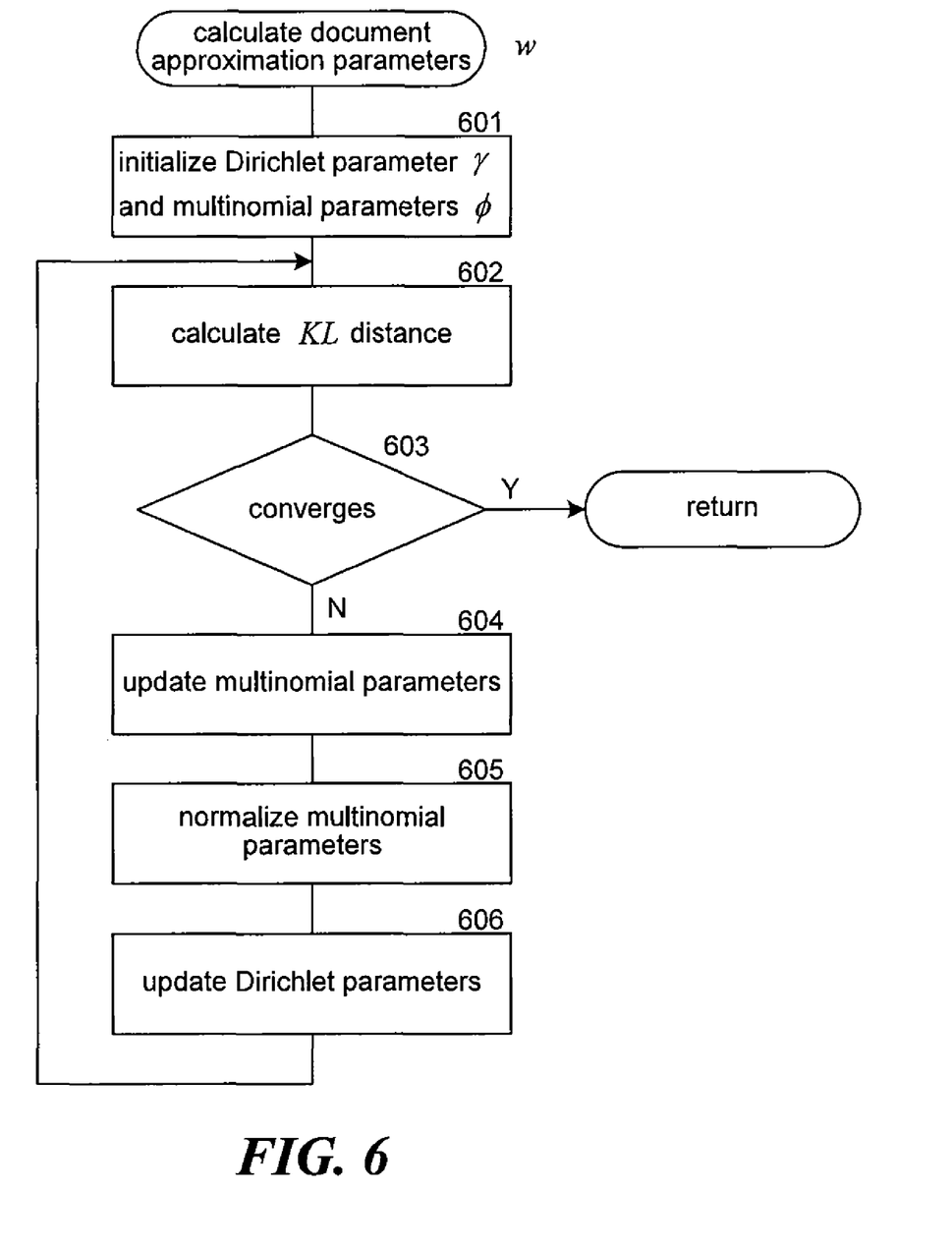
FIG. 6 is a flow diagram that illustrates the processing of the calculate document approximation parameters in one embodiment.

FIG. 6 is a flow diagram that illustrates the processing of the calculate document approximation parameters in one embodiment. The component is passed a document and calculates its document approximation parameters. In block 601, the component initializes the Dirichlet parameter and the multinomial parameters. In blocks 602-606, the component loops updating the Dirichlet parameter and the multinomial parameters until they converge on a solution. In block 602, the component calculates the distance according to Equation 6. In decision block 603, if the distance converges on a solution, then the component returns, else the component continues at block 604. In block 604, the component updates the multinomial parameters according to Equation 7. In block 605, the component normalizes the multinomial parameters. In block 606, the component updates the Dirichlet parameters according to Equation 7 and then loops to block 602 to perform the next iteration.

Figure 7:
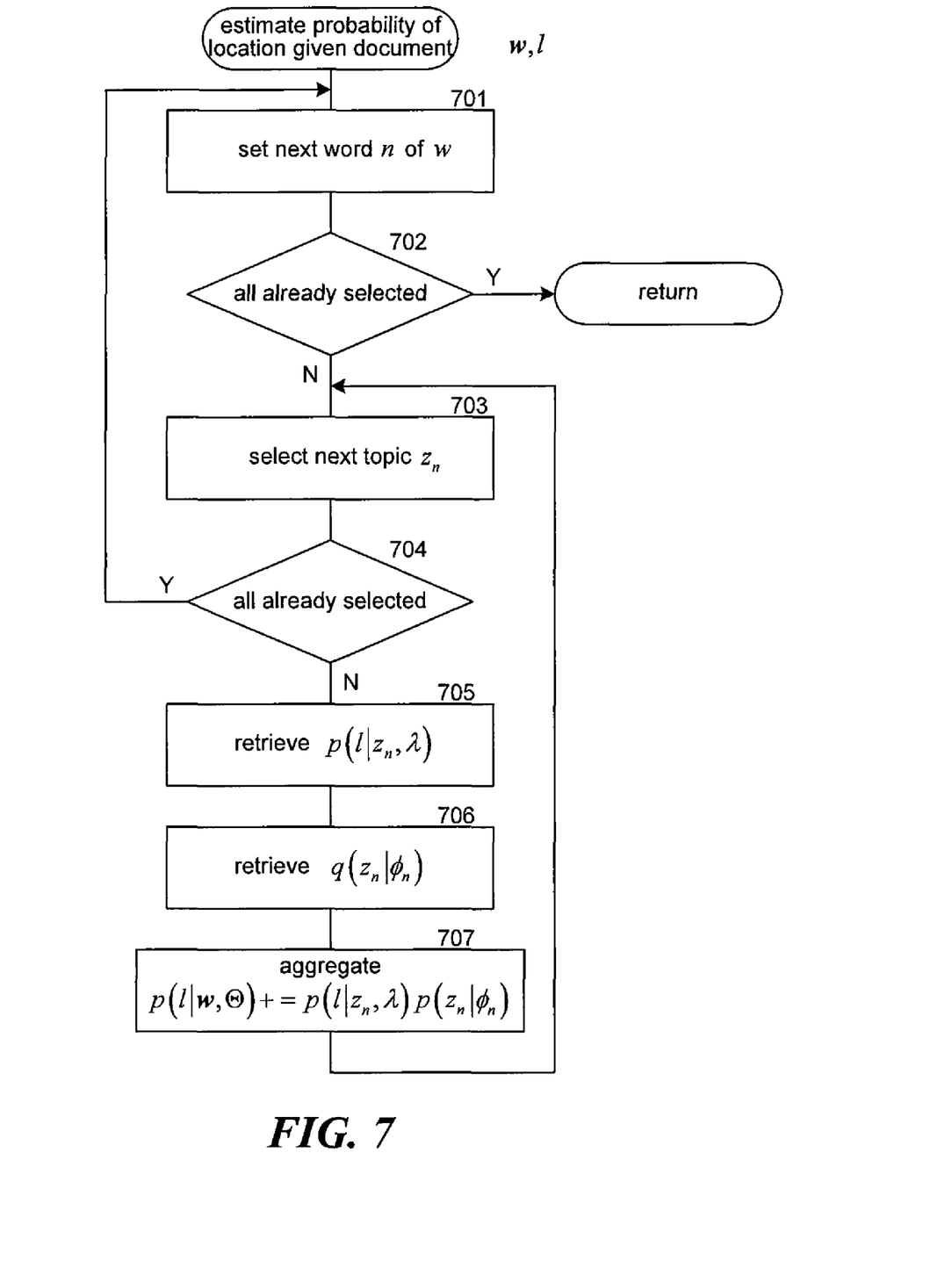
FIG. 7 is a flow diagram that illustrates the processing of the estimate probability of location given a document component of the location system in one embodiment.

FIG. 7 is a flow diagram that illustrates the processing of the estimate probability of location given document component of the location system in some embodiments. The component is passed a document and a location and returns an indication of the probability that the location is associated with the document. The component loops processing each word of the document and each topic of the document. In block 701, the component selects the next word of the document. In decision block 702, if all the words have already been selected, then the component returns the probability, else the component continues at block 703. In block 703, the component selects the next topic for the selected word. In decision block 704, if all the topics have already been selected, then the component loops to block 701 to select the next word, else the component continues at block 705. In block 705, the component retrieves the probability of that location given the selected topic. In block 706, the component retrieves the probability of the selected topic given the multinomial parameters for the document. In block 707, the component multiplies the probabilities and aggregates them into a probability of the location given the document. The component then loops to block 703 to select the next topic for the selected document.

Figure 8:
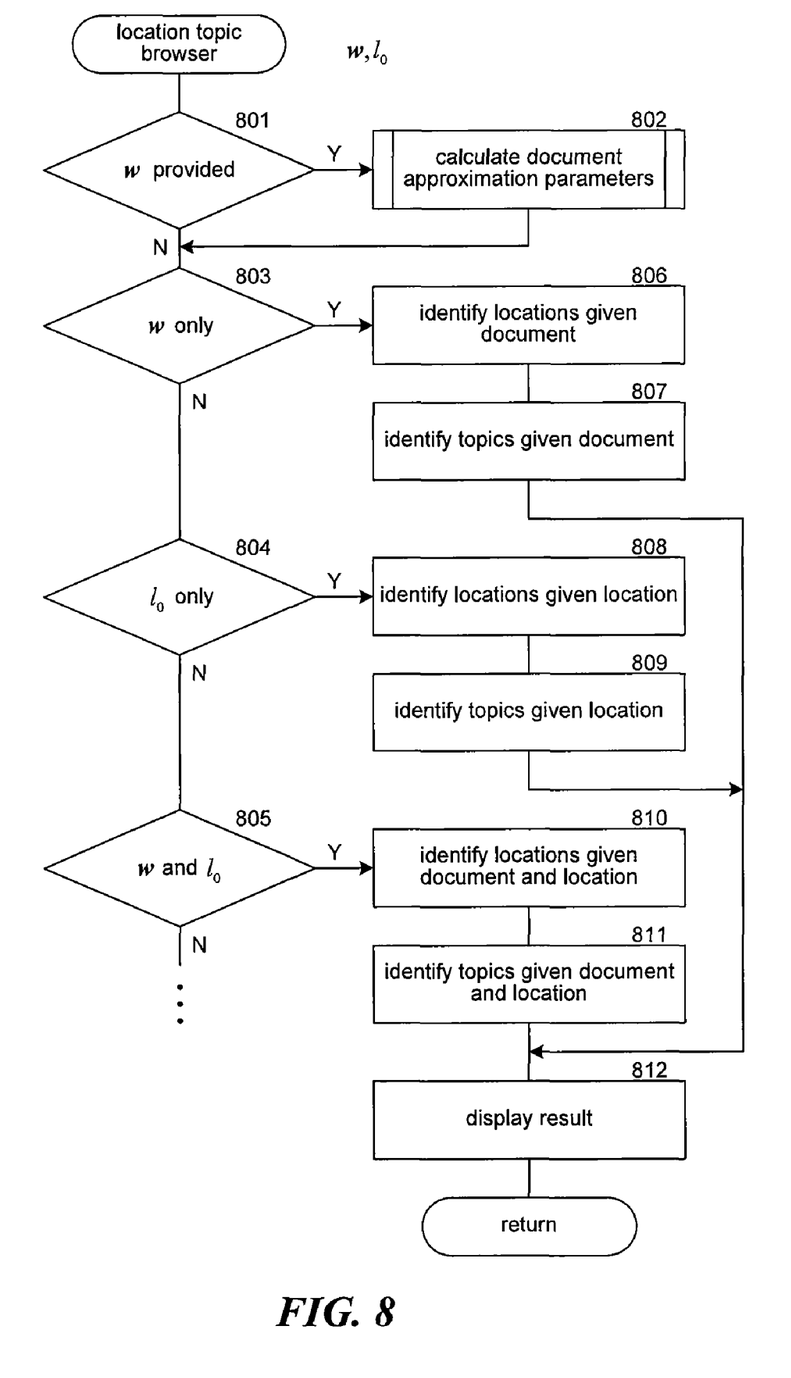
FIG. 8 is a flow diagram that illustrates the processing of a location topic browser component of the location system in one embodiment.

FIG. 8 is a flow diagram that illustrates the processing of a location topic browser component of the location system in one embodiment. The component is passed a query with the "what" field representing a document and the "where" field representing a location. In decision block 801, if only the "what" field is provided, then the component continues at block 802, else the component continues at block 803. In block 802, the component invokes a calculate document approximation parameters component to calculate the document approximation parameters for the "what" field. In decision blocks 803-805, the component determines whether only the "what" field, only the "where" field, or both fields have been provided. In blocks 806-807, the component identifies locations and topics when only the "where" field is provided.

In blocks 808-809, the component identifies locations and topics when only the "where" field is provided. In blocks 810-811, the component identifies locations and topics when both the "what" field and the "where" field are provided. In block 812, the component displays the locations and topics sorted by probability.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method in a computing device for identifying a location associated with a first document, the method comprising:
providing a collection of documents of words, each document labeled with an associated location, the collection not including the first document;
generating by the computing device collection level parameters for a latent Dirichlet allocation style model for the collection of documents that is based on latent topics and the location of each document, the collection level parameters indicating a probability that a document in the collection relates to each latent topic, a probability that each word of the collection relates to each latent topic, and a probability that each location of the collection relates to each latent topic, wherein a variational expectation maximization algorithm is used to estimate the collection level parameters that are a maximization of a lower bound on the collection level parameters represented by a summation for each document in the collection of the log of the conditional probability of the document and its location given the collection level parameters;
for each location, estimating, using the collection level parameters, a probability that the location is associated with the first document based on an aggregation of, for each topic, the conditional probability of the location given the topic and the conditional probability of the topic given the document, the conditional probabilities being derived from the collection of documents in which each document is labeled with an associated location; and
selecting the location with the highest probability as the location associated with the first document.

2. The method of claim 1 wherein the estimating of the probability that a location is associated with the first document includes estimating a posterior probability that the first document relates to each topic and that each word of the first document relates to each topic given the first document and the location.

3. The method of claim 2 wherein a variational probabilistic distribution is used to approximate the posterior probability.

4. The method of claim 1 including wherein the first document represents search terms of a query and wherein the probability for each location is estimated and the locations with the highest probability are indicated as locations that may be associated with the query.

5. The method of claim 4 including estimating the probability of each topic and the topics with the highest probability are indicated as topics that may be associated with the query.

6. The method of claim 5 wherein a topic is represented by the words with the highest probabilities to be associated with the topic.

7. A computer-readable storage medium that is not a signal encoded with instructions for controlling a computing device to estimate topics and locations associated with target documents, by a method comprising:
providing a collection of documents of words, each word of a document associated with a location;
generating collection level parameters for a latent Dirichlet allocation style model for the collection of documents based on latent topics and the location of each document, the collection level parameters relating to probabilities of latent topics, locations, and words of the collection, the collection level parameters indicating a probability that a document in the collection relates to each latent topic, a probability that each word of the collection relates to each latent topic, and a probability that each location of the collection relates to each latent topic, wherein a variational expectation maximization algorithm is used to estimate the collection level parameters that are a maximization of a lower bound on the collection level parameters represented by a summation for each document in the collection of the log of the conditional probability of the document and its location given the collection level parameters; and
estimating using the collection level parameters probabilities of topics and locations being associated with each of the target documents; and
for each target document, selecting the location with the highest estimated probability as the location associated with that target document.

8. The computer-readable storage medium of claim 7 wherein the estimating of the probability that a location is associated with a target document includes estimating a posterior probability that a document relates to each topic and that each word of the document relates to each topic given the target document and the location.

9. The computer-readable storage medium of claim 8 wherein a variational probabilistic distribution is used to approximate the posterior probability.

10. The computer-readable storage medium of claim 7 wherein the words of a target document are a query and the locations with the highest estimated probabilities relate to the query.

11. The computer-readable storage medium of claim 7 wherein a target location is provided as a query and wherein the probability of each location being related to that target location is provided by a summation for each topic of the conditional probability of the location given the topic and the conditional probability of the topic given the target location.

12. The computer-readable storage medium of claim 7 wherein a target location and words of a target document are provided as a query and wherein the probability of each location being related to the query is provided by a summation for each topic of the probability of the location given the topic and the probability of the topic given the target location and the target document.

13. A computing device for determining topics and locations associated with a target document, comprising:
a document store having a collection of documents of words, each word of a document associated with a location;

a memory storing computer-implemented instructions of
a component that generates collection level parameters for a latent Dirichlet allocation model for the collection of documents based on latent topics and the location of each document, the collection level parameters relating to probabilities of latent topics, locations, and words of the collection including a probability that each location of the collection relates to each latent topic, the collection level parameters indicating a probability that a document in the collection relates to each latent topic, a probability that each word of the collection relates to each latent topic, and a probability that each location of the collection relates to each latent topic, wherein a variational expectation maximization algorithm is used to estimate the collection level parameters that are a maximization of a lower bound on the collection level parameters represented by a summation for each document in the collection of the log of the conditional probability of the document and its location given the collection level parameters; and a component that estimates using the collection level parameters probabilities of topics and locations being associated with the target document; and a component that selects the location with the highest estimated probability for a target document as the location associated with that target document; and a processor for executing the computer-implemented instructions stored in memory.

14. The computing device of claim 13 wherein each word of a document in the document store is associated with the same document.

* * * * *